United States Patent [19]

Klaas

[11] Patent Number: 4,579,570

[45] Date of Patent: Apr. 1, 1986

[54] SHAKING MECHANISM FOR FILTER BAGS

[75] Inventor: Lawrence S. Klaas, Brookfield, Wis.

[73] Assignee: Ruemelin Manufacturing Co., Inc., Milwaukee, Wis.

[21] Appl. No.: 615,930

[22] Filed: May 31, 1984

[51] Int. Cl.$^4$ .............................................. B01D 46/04
[52] U.S. Cl. ................................. 55/305; 55/341 NT
[58] Field of Search ................... 55/304, 305, 341 NT

[56] References Cited

U.S. PATENT DOCUMENTS

| | | | |
|---|---|---|---|
| 898,426 | 9/1908 | Benedict | 55/305 |
| 1,632,895 | 6/1927 | Hagelthorn | 55/305 |
| 1,835,093 | 12/1931 | Ruemelin | 55/305 |
| 2,823,762 | 2/1958 | Bunnell | 55/341 NT |
| 2,830,676 | 4/1958 | Schneider | 55/304 |
| 3,295,298 | 1/1967 | Mackey | 55/305 |
| 3,550,358 | 12/1970 | McCabe | 55/305 |
| 3,849,091 | 11/1974 | Peterson | 55/341 NT |
| 4,298,362 | 11/1981 | Krull et al. | 55/304 |

Primary Examiner—Kathleen J. Prunner
Attorney, Agent, or Firm—Michael, Best & Friedrich

[57] ABSTRACT

The shaking mechanism for the filter bags in the dust removal section of an abrasive blast cabinet includes a shaker rod from which the filter bags are suspended. The shaker rod is mounted for both axial movement along and rotational movement about its longitudinal axis and is axially reciprocated in response to rotating an operating handle located at the front of the cabinet in opposite directions. During axial movement of the shaker rod, a laterally extending follower member rides along oppositely inclined cam surfaces on laterally spaced ramps, causing a simultaneous rotation of the shaker rod and thereby imparting both lateral and longitudinal shaking movement on the filter bags to improve the shaking action for dislodging particulate material collected on a surface of the filter bags.

9 Claims, 9 Drawing Figures

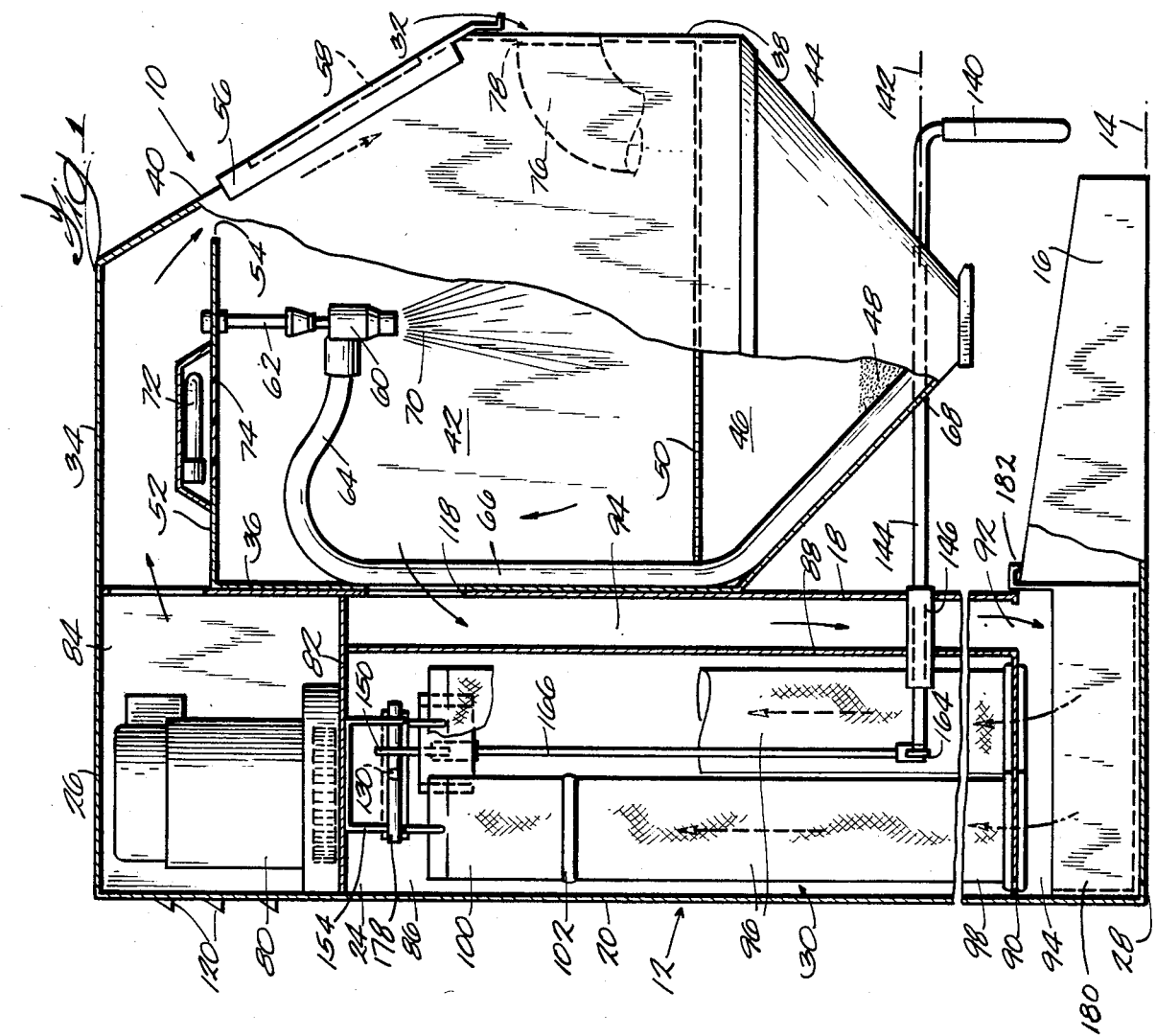

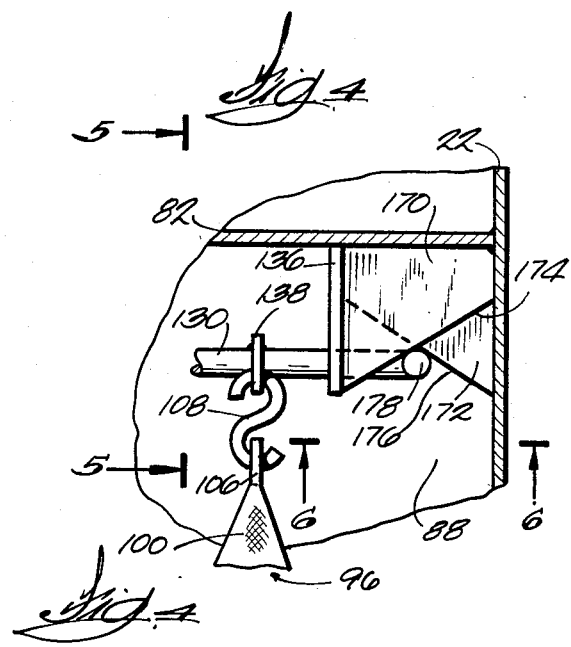
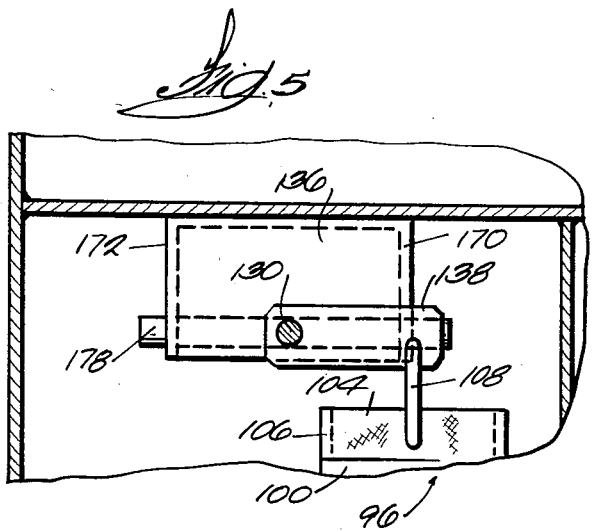
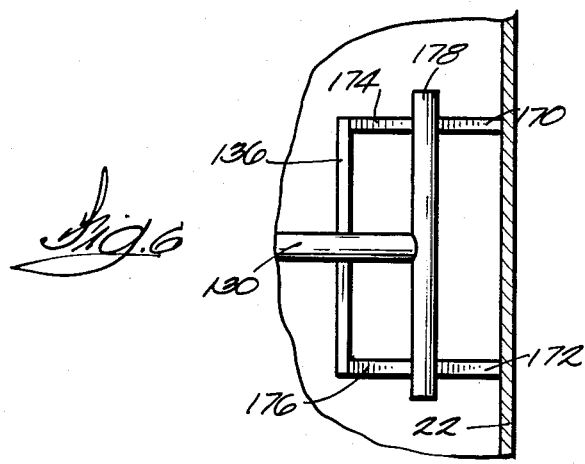
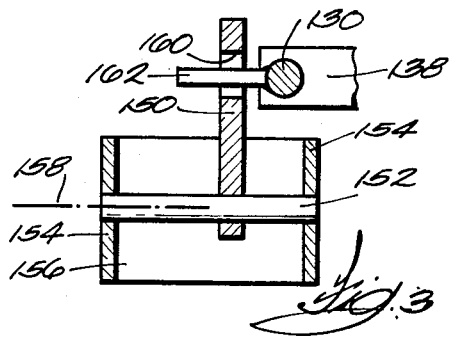
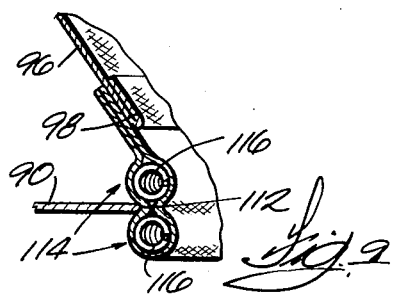
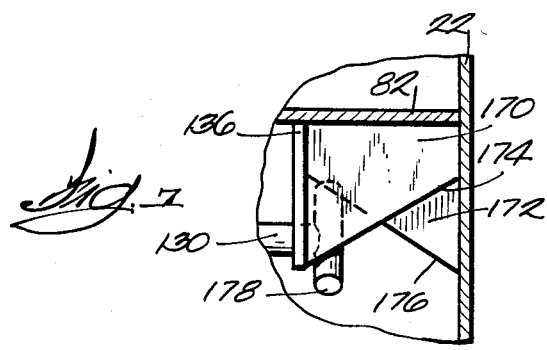
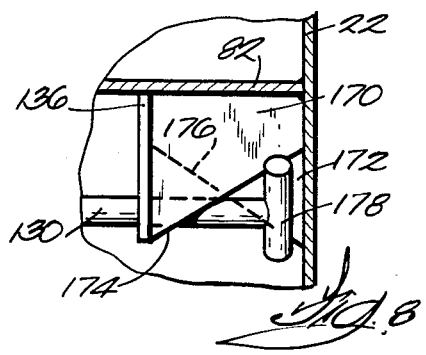

# SHAKING MECHANISM FOR FILTER BAGS

BACKGROUND OF THE INVENTION

This invention relates to shaking mechanisms for bag-like filters and, in one aspect, relates to shaking mechanisms for periodically dislodging particulate material collected on a surface of bag-like filters used in abrasive blasting cabinets and the like.

Abrasive blast cabinets typically include a blast compartment in which the article or articles to be cleaned or polished by an abrasive blasting material is placed. The operator usually reaches through arm holes protected by rubber gloves and, observing through a front window in the compartment, either picks up an article to be cleaned and moves it under a stationary blast nozzle or picks up a portable blast nozzle and moves it about to direct a jet stream of the abrasive material over the article. Smaller, dust-forming particles of the abrasive material tend to disperse throughout the blast compartment during the cleaning operation and, if not removed, can partially or completely mask visibility of the article being cleaned or polished to the operator.

One approach for removing these dust-forming particles is to purge the blast compartment by directing a flow of air therethrough and circulating the dust-ladened air exiting from the blast compartment through the interior of one or more bag-like filters to remove the particulate material. In order to prevent plugging, the filter bags must be periodically shocked or shaken to dislodge and remove the particulate material collecting on the inner surface.

Examples of prior shaking mechanisms are disclosed in U.S. Pat. Nos. 1,601,148, 1,743,934 and 1,835,093. These mechanisms provide primarily only a lateral movement of the filter bags. The mechanism disclosed in U.S. Pat. No. 1,743,934 includes U-shaped shaker members which engage the outer surfaces of the filter bags and, therefore, can cause considerable wear. The manually operated shaking mechanism disclosed in U.S. Pat. No. 1,835,093 includes a hand lever which is located at a side or rear of the device and protrudes from the exterior of the device. Thus, in addition to increasing the overall outside dimension, some space from the wall and/or adjacent equipment must be made available to provide the operator with access to the hand lever.

SUMMARY OF THE INVENTION

One of the objects of the invention is to provide a shaking mechanism for flexible, bag-like filters which is simply constructed and is capable of effectively dislodging particulate material collecting on a surface of the filter bags with minimum wear to the filter bags.

Another object of the invention is to provide a shaking mechanism for flexible, bag-like filters which is arranged to move the filter bags in both lateral and longitudinal directions.

Another object of the invention is to provide a manually-operated shaking mechanism for flexible, bag-like filters in an abrasive blast cabinet or the like and including an operating handle which is located at the front of the cabinet to facilitate visibility and accessibility to the operator and minimize the space required for the blast cabinet.

Other objects, aspects and advantages of the invention will become apparent to those skilled in the art upon reviewing the following detailed description, the drawings and the appended claims.

The invention provides a shaking mechanism for dislodging particulate material collected on a surface of a flexible, bag-like filter which mechanism includes an elongated shaker rod mounted for both axial movement along and rotational movement about a first axis, a support bracket affixed on and extending radially outwardly from the shaker rod, means fastening one end of the filter to the support bracket at a location radially spaced from the first axis, an operating handle mounted for rotational movement in opposite directions about a second axis, a linkage operably connecting the operating handle with the shaker rod for causing reciprocative axial movement of the shaker rod in response to rotational movement of the operating handle in opposite directions, and means for simultaneously rotating the shaker rod in opposite directions about the first axis in response to reciprocative movement of the shaker rod.

When used with vertically disposed filters, the first axis is generally horizontal, the second axis is generally horizontal and extends generally perpendicularly to the first axis, and the upper end of the filter is fastened to the support.

In one embodiment, the linkage includes a bell crank mounted for pivotal movement about a third axis extending transversely to the first axis, having a first end and having a second end pivotally connected to the shaker rod, a lever arm connected to the operating handle for common rotation therewith, and a connecting link having one end pivotally connected to the lever arm and the opposite end pivotally connected to the first end of the bell crank.

In one embodiment, the rotating means includes a pair of laterally spaced ramps located on the opposite sides of the shaker rod and having oppositely inclined cam surfaces, the cam surface of one ramp being inclined upwardly relative to axial movement of the shaker rod in one direction and the cam surface on the other ramp being inclined downwardly relative to axial movement of the shaker rod in the same direction. The rotating means also includes a follower member mounted on and extending radially outwardly from the opposite sides of the shaker rod and having portions adapted to engage and ride along the cam surfaces.

In one embodiment, the shaking mechanism is adapted for use with a plurality of filter bags and includes a plurality of support brackets axially spaced along the shaker rod in staggered relationship with alternate ones extending radially outwardly in opposite directions from the shaker rod.

BRIEF DESCRIPTION OF THE DRAWINGS

FIG. 1 is a fragmentary, side elevational view, partially broken away and sectioned, of a dental blast cabinet incorporating a shaking mechanism of the invention.

FIG. 2 is a fragmentary rear view, partially broken away, of the dental blast cabinet shown in FIG. 1.

FIG. 3 is an enlarged sectional view taken generally along line 3—3 in FIG. 2.

FIG. 4 is an enlarged fragmentary view of one end of the shaker rod for the shaking mechanism.

FIG. 5 is a sectional view taken generally along line 5—5 in FIG. 4.

FIG. 6 is a view taken generally along line 6—6 in FIG. 4.

FIGS. 7 and 8 are enlarged fragmentary views illustrating the rotational position of the shaker rod at opposite ends of its axial movement.

FIG. 9 is an enlarged fragmentary view showing the mounting for the lower ends of the filters.

DESCRIPTION OF THE PREFERRED EMBODIMENTS

The shaking mechanism provided by the invention can be adapted for use with bag-like filters in a wide variety of different devices wherein the filters require periodic shaking to dislodge and remove particulate material collecting on one surface. It is particularly adaptable for use with filter bags used in dust removal sections for abrasive blast cabinets and will be described in connection with a dental blast cabinet.

Illustrated in the drawings is a dental blast cabinet 10 having an upright rear housing 12 adapted to rest on the floor 14 and having a pair of laterally spaced, forwardly extending feet 16 to provide stability. A rear housing 12 has a generally rectangular cross section and includes a front wall 18, a rear wall 20, opposed side walls 22 and 24, a top wall 26 and a bottom wall 28 which cooperate to define a dust removal compartment 30.

Mounted on the upper portion of the rear housing 12 and extending forwardly of the front wall 18 is a front housing 32 including a top wall 34 (can be separate or co-extensive with the rear housing top wall 26), a rear wall 36 abutting the rear housing front wall 18 and a front wall 38 having an inclined upper portion 40, all of which cooperate to define a blast compartment 42. The front housing 32 also includes an inverted pyramid-spaced bottom wall 44 which serves as a hopper 46 for containing an abrasive blasting material 48 suitable for cleaning or polishing, such as sand, blast powder, or the like. The blast compartment 42 and the hopper 46 are separated by a perforated table or platform 50 for temporarily supporting the articles to be cleaned or polished, such as dentures, dental molds or castings and the like, and/or preventing the articles from being dropped into the abrasive blasting material 48.

Extending from the rear wall 36 in parallel relationship to the top wall 34 is a partition 52 which forms the ceiling of the blast compartment 42. The front edge 54 of the ceiling partition 52 is spaced from the inclined portion 40 of the front wall 38. An access opening in the inclined portion 40 of the front wall 38 is covered by a door 56 including a transparent window 58 through which the operator can view the blasting operation inside the blast compartment 42.

A conventional suction or venturi type blast gun 60 is supported from the ceiling partition 52 via a nipple 62 which is connected to an external source of pressurized air via suitable conduits, an air filter and a pressure regulating valve, none of which is shown. One end 64 of a pick up tube 66 is connected to the blast gun 60 and the other end 68 is submerged in the abrasive blasting material 48. A vacuum condition created in the blast gun 60 by pressurized air flowing therethrough causes the abrasive blasting material 48 to flow upwardly through the pick up tube 66 from the hopper 46 to the blast gun 60. The abrasivve blasting material 48 is mixed with incoming pressurized air in the blast gun 60 and a pressurized jet 70 of the material is formed for cleaning or polishing.

The interior of the blast compartment 42 is illuminated by one or more fluorescent light bulbs 72 located above a light-transmitting panel 74 in the ceiling partition 52. Articles to be cleaned or polished are held in the jet 70 by the operator with a pair of rubber gloves 76 (one fragmentarily illustrated by dashed lines in FIG. 1) extending from arm holes 78 in the front wall 38. Most of the abrasive blasting material 48 passes through the perforated platform 50 and falls into the hopper 46 for re-use. Smaller and/or lighter particles tend to form a dust which can disperse throughout the blast compartment 42 and partially or completely mask the operator's visibility.

Located in the dust removal compartment 30 is exhaust fan 80 mounted on a horizontally extending partition 82 which separates the dust removal compartment 30 into a fan chamber 84 and a filter chamber 86. Only the suction side of the fan 80 communicates with the filter chamber 86.

The filter chamber 86 has a vertical wall or baffle 88 spaced rearwardly from the rear housing front wall 18 and a horizontal wall or baffle 90 including an opening 92 and spaced above the rear housing bottom wall 28. The vertical and horizontal baffles 88 and 90 and the opening 92 define a passageway 94 for dust-ladened air from the blast compartment 42 as explained in more detail below.

A plurality (e.g., 5) of conventional flexible, tubular filter bags 96, made from a woven fabric such as cotton, are vertically disposed in the filter chamber 86. The lower end 98 of each filter bag 96 is open and the upper end 100 is closed in the shape of a peak. The upper end 100 (FIGS. 1 and 2) includes a stitched hem or cuff 102 which receives a suitable expanding ring or hoop (not shown) for holding the upper portion of the tubular bag to its fully expanded diameter. The tip of the upper end 100 includes a stitched hem or cuff 104 (FIG. 5) which receives a flat strip 106 of metal or similar rigid material which serves as a reinforcement support for the filter bag 96. The upper ends 100 of the filter bag 96 are suspended by hooks 108 or other suitable fastening means from a shaking mechanism 110 of the invention described in more detail below.

As best shown in FIG. 9, the bottom baffle 90 includes a plurality of apertures 112 which receives the open lower ends 98 of the filter bags 96. The lower end 98 of each filter bag 96 includes a pair of stitched hems or cuffs 114, each of which receives a coiled spring 116 in the form of a ring for holding the lower portion of the tubular bag to its fully expanded diameter and for retaining the lower end of the bag in place on the bottom baffle 90. The lowermost portion of each filter bag 96 is inserted through an aperture 112 so that the springs 116 straddle the bottom baffle 90 in the vicinity surrounding the aperture 112 and hold the lower end 98 of the filter bag 96 in place.

When the fan 80 is operating, air flows, as indicated generally by the arrows in FIG. 1, from the fan chamber 84, through the space between the front housing top wall 34 and the ceiling partition 52, downwardly through the opening between the front edge 54 of the ceiling partition 52 and the inclined front wall portion 40 and along the front housing front wall 38, circulates through the blast compartment 42, and then exits from the blast compartment 42 through an opening 118 extending through the front housing rear wall 36 and the rear housing front wall 18 into the passageway 94. Dust formed during the blasting or polishing operation is swept or purged from the blast compartment 42 by this air flow and the articles being cleaned or polished remain visible to the operator.

As further generally illustrated by the arrows in FIG. 1, the fan 80 draws the dust-ladened air from the blast compartment 42 downwardly through the passageway 94, upwardly through the interior of the filter bags 96 and exhausts clean air to the atmosphere through an opening (not shown) in the fan chamber 84. Fine particles of the abrasive blasting material 48 and other particulate material are removed and collect on the interior surfaces of the filter bag 96 as the air passes therethrough. Fresh air is drawn by the fan 80 into the fan chamber 84 through louvers 120 or the like in the rear housing rear wall 20 and circulated through the blast compartment 42 as described above.

In order to prevent plugging, the filter bags 96 are periodically shaken by manually operating the shaking mechanism 110 to dislodge the collected particulate matter. The shaking mechanism 110 includes an elongated shaker rod 130 mounted in the upper portion of the filter chamber 86 for both axial movement along and rotational movement about a first generally horizontal axis 132. In the specific embodiment illustrated, the shaker rod 130 is supported for relative axial and rotational movement by a pair of axially spaced brackets 134 and 136 mounted on the underside of the partition 82.

Affixed on and extending radially outwardly from the shaker rod 130 is a plurality of support arms or brackets 138 on which the filter bags 96 are suspended. Each filter bag 96 is suspended from a support bracket 138 by a hook 108 at a point radially spaced from the shaker rod axis 132. The support brackets 138 preferably are axially spaced along the shaker rod 130 at substantially equal distances and in staggered relationship (i.e., alternate ones extend radially outwardly in opposite directions from the shaker rod 130) so as to minimize the space required for the filter bags 96.

The shaking mechanism 110 is manually operated by a operating handle 140 located at the front of the blast cabinet 10 and below the front housing 32 where it is readily visible and accessible to the operator and does not require additional space for operation. The operating handle 140 is mounted for rotational movement in opposite directions about a second generally horizontal axis 142 extending generally perpendicularly to the shaker rod axis 132. In the specific construction illustrated, the operating handle 140 is connected to a horizontal shaft 144 which extends into the filter chamber 86 generally perpendicularly to the shaker rod axis 132 and is journaled in a bushing 146 mounted in the rear housing front wall 18 and the vertical baffle 88.

The operating handle shaft 144 is connected to the shaker rod 130 through a linkage arrangement which causes reciprocative axial movement of the shaker rod 130 in response to rotation of the operating handle 140 in opposite directions. In the specific embodiment illustrated, the linkage arrangement includes a bell crank 150 having a pivot pin 152 (FIG. 3) pivotally supported in laterally spaced ears 154 of a U-shaped support 156 mounted on the rear housing side wall 24. Thus, the bell crank 150 pivots about a third generally horizontal axis 158 extending generally parallel to the operating handle axis 142 and transversely or generally perpendicularly to the shaker rod axis 132.

As best shown in FIG. 3, one end of the bell crank 150 is pivotally connected to the shaker rod 130 via a slot 160 in the bell crank 150 and a radially extending pin 162 on the shaker rod 130. This arrangement, in addition to affording relative pivotal movement, permits rotational movement of the shaker rod 130 about its axis 132 relative to the bell crank 150.

The linkage arrangement also includes a lever arm 164 mounted on the operating handle shaft 144 for common rotation therewith and a connecting link 166 having one end pivotally connected to the bell crank 150 and the opposite end pivotally connected to the lever arm 164.

As viewed in FIG. 2 from in the rear of the cabinet, clockwise and counterclockwise rotation of the operating handle shaft 144 respectively moves the shaker rod 130 to the right and to the left. The back and forth lateral movement of the upper ends of the filter bags 96, resulting from the reciprocative axial movement of the shaker rod 130, dislodges particulate matter collected on the interior surfaces of the filter bags 96.

To also impart a longitudinal movement of the filter bags 96 and thereby enhance the shaking action, means are provided for simultaneously rotating the shaker rod 130 in opposite directions about its axis 132 in response to axial movement of the shaker rod 130. In the specific embodiment illustrated, a pair of ramps in the form of laterally spaced brackets 170 and 172 having oppositely inclined cam surfaces 174 and 176 are located on the opposite sides of the shaker rod 130 adjacent the end opposite to the end connected to the bell crank 150. As viewed in FIG. 4, the cam surface 174 is inclined upwardly while the cam surface 176 is inclined downwardly in a direction toward the right.

Mounted on the end and extending radially outwardly from the opposite sides of the shaker rod 130 is a follower member 178 which is arranged to engage and ride along the cam surfaces 174 and 176 as the shaker rod 130 is axially reciprocated.

The parts of the shaking mechanism 110 preferably are arranged so that, when the operating handle 14 is located in a starting position (e.g., straight down), the follower member 178 is located generally in a vicinity where the planes of the cam surfaces 174 and 176 intersect as shown in FIG. 4. When the operating handle 140 is rotated in one direction to axially move the shaker rod 130 to the left as viewed in FIGS. 4 and 6–8, the follower member 178 rides along the cam surfaces 174 and 176 and causes simultaneous rotation of the shaker rod 130 in one direction as shown in FIG. 7. Rotation of the operating handle 140 to axially move the shaker rod 130 to the right causes simultaneous rotation of the shaker rod 130 in the opposite direction as shown in FIG. 8.

Thus, rapid rotation of the operating handle 140 in opposite directions simultaneously imparts lateral and longitudinal movement of the filter bags 96, thereby improving the shaking action for dislodging collected particulate material. The mechanical advantage which can be provided by virtue of making the lever arm 164 longer than the lever arm of the bell crank 150 decreases the effort required by the operator to produce a highly effective shaking of the filter bags 96.

Material dislodged from the filter bags 96 by operation of the shaking mechanism 110 falls down into a drawer-like, clean out container 180 slidably mounted in the bottom of the dust removal section 30. The clean out container 180 includes a front pull 182 and can be conveniently removed from the front for dumping of the collected material by simply pulling on the pull 182.

From the above description, it can be seen that the shaking mechanism provided by the invention has several advantages. An operator can simultaneously move the upper ends of the filter bags laterally and longitudinally to provide a superior shaking action by simply rotating the operating handle back and forth. This highly effective shaking action can be provided on a number of filter bags with minimal effort by the operator because of the mechanical advantage provided by the linkage connecting the operating handle with the shaker rod. The operating handle is located at the front of the blast cabinet where it is readily accessible to the operator and where it is visible to remind the operator to shake the filter bags. Also, location of the operating handle at the front minimizes the space required for the blast cabinet. That is, the cabinet can be moved close to the wall and/or close to other equipment.

From the foregoing description, one skilled in the art can easily ascertain the essential characteristics of the invention and, without departing from the spirit and scope thereof, make various changes and modifications to adapt it to various usages.

I claim:

1. A flexible, bag-like filter and a shaking mechanism for dislodging particulate material collected on a surface of said filter, said shaking mechanism comprising
    an elongated shaker rod mounted for both axial movement along and rotational movement about a first axis,
    a support bracket affixed on and extending radially outwardly from said shaker rod,
    means fastening one end of said filter to said support bracket at a location radially spaced from said first axis,
    an operating handle mounted for rotational movement in opposite directions about a second axis,
    linkage means operably connecting said operating handle with said shaker rod for causing reciprocative axial movement of said shaker rod in response to rotational movement of said operating handle in opposite directions, and
    rotating means for simultaneously rotating said shaker rod in opposite directions about said first axis in response to reciprocative movement of said shaker rod.

2. The combination of claim 1 wherein
    said first axis is generally horizontal,
    said second axis is generally horizontal and extends generally perpendicularly to said first axis,
    the filter is vertically disposed and has upper and lower ends, and
    said fastening means fastens the upper end of said filter to said support bracket.

3. The combination of claim 2 wherein said linkage means includes
    a bell crank mounted for pivotal movement about a third axis extending transversely to said first axis, said bell crank having a first end and having a second end pivotally connected to said shaker rod,
    a lever arm connected to said operating handle for common rotation therewith, and
    a connecting link having opposite ends, one end being pivotally connected to said lever arm and the opposite end being pivotally connected to said first end of said bell crank for pivoting said bell crank in opposite directions about said third axis and thereby causing reciprocative axial movement of said shaker rod in response to rotational movement of said operating handle in opposite directions.

4. The combination of claim 3 wherein said rotating means includes
    a pair of laterally spaced ramp means located on the opposite sides of said shaker rod and having oppositely inclined cam surfaces, said cam surface on one of said ramp means being inclined upwardly relative to axial movement of said shaker rod in one direction and said cam surface on the other of said ramp means being inclined downwardly relative to axial movement of said shaker rod in said one direction, and
    a follower member mounted on and extending radially outwardly from the opposite sides of said shaker rod, said follower member having portions which engage and ride along said cam surfaces and cause rotation of said shaker rod in one direction during axial movement of said shaker rod in one direction and cause rotation of said shaker rod in the opposite direction during axial movement of said shaker rod in the opposite direction.

5. The combination of claim 2 further including a plurality of flexible bag-like filters, a like number of support brackets axially spaced along said shaker rod in staggered relationship with alternate ones extending radially outwardly in opposite directions from said shaker rod and a like number of fastening means with each fastening means fastening a different one of said filters to a different one of said brackets.

6. A flexible, bag-like filter and a shaking mechanism for dislodging material collected on a surface of said filter, said shaking mechanism comprising
    an elongated shaker rod mounted for both axial movement along and rotational movement about a first axis;
    a support bracket affixed on and extending radially outwardly from said shaker rod,
    means fastening one end of said filter to said support bracket at a location radially spaced from said first axis;
    an operating handle mounted for rotational movement in opposite directions about a second axis;
    linkage means operably connecting said operating handle with said shaker rod for causing reciprocative axial movement of said shaker rod in response to rotational movement of said operating handle in opposite directions said linkage means including
    a bell crank mounted for pivotal movement about a third axis extending transversely to said first axis, having a first end and having a second end pivotally connected to said shaker rod.
    a lever arm connected to said operating handle for common rotation therewith, and
    a connecting link having opposite ends, one end being pivotally connected to said lever arm and the opposite end being pivotally connected to said first end of said bell crank for
    pivoting said bell crank in the opposite direction about said third axis in response to rotational movement of said operating handle in opposite directions; and
    rotating means for simultaneously rotating said shaker rod in opposite directions about said first axis in response to reciprocative movement of said shaker rod, said rotating means including
    a pair of laterally spaced ramp means located on the opposite sides of said shaker rod and having oppositely inclined cam surfaces, said cam surface on one of said ramp means being inclined upwardly relative to axial movement of said shaker rod in one direction and said cam surface on the other of said ramp means being inclined downwardly relative to axial movement of said shaker rod in said one direction, and a follower member mounted on and extending radially outwardly from the opposite sides of said shaker rod, said follower member having portions which engage and ride along said cam surfaces and cause rotation of said shaker rod in one direction during axial movement of said shaker rod in one direction and rotate said shaker rod in the opposite direction during axial movement of said shaker rod in the opposite direction.

7. In a device including a housing defining a compartment, a dust removal portion in communication with and located rearwardly of the compartment and including a plurality of vertically disposed, flexible bag-like filters, and means for withdrawing dust-ladened air from the compartment and circulating it through the filters to remove particulate material therefrom, the improvement comprising a shaker mechanism for dislodging particulate material collected on a surface of said filters comprising an elongated shaker rod mounted inside the dust removal portion for both axial movement along and rotational movement about a first generally horizontal axis, a plurality of support brackets, one for each of the filters, affixed on said shaker rod and extending radially outwardly from said shaker rod, means fastening the upper end of each filter to one of said support brackets at a location radially spaced from said first axis, an operating handle located in front of the dust removal portion and mounted below said shaker rod for rotational movement in opposite directions about a second generally horizontal axis extending generally perpendicularly to said first axis, linkage means operably connecting said operating handle with said shaker rod for causing reciprocative axial movement of said shaker rod in response to rotational movement of said operating handle in opposite directions, and rotating means for simultaneously rotating said shaker rod in opposite directions about said first axis in response to reciprocative movement of said shaker rod.

8. A device according to claim 7 wherein said linkage means includes a bell crank mounted for pivotal movement about a third axis extending generally perpendicularly to said first axis, having a first end and having a second end pivotally connected to said shaker rod, a lever arm connected to said operating handle for common rotation therewith, and a connecting link having opposite ends, one end being pivotally connected to said lever arm and the opposite end being pivotally connected to said first end of said bell crank for pivoting said bell crank in opposite directions about said third axis and thereby causing reciprocative movement of said shaker rod in response to rotational movement of said operating handle in opposite directions.

9. A device according to claim 8 wherein said rotating means includes a pair of laterally spaced ramp means located on the opposite sides of said shaker rod and having oppositely inclined cam surfaces, said cam surface on one of said ramp means being inclined upwardly relative to axial movement of said shaker rod in one direction and said cam surface on the other of said ramp means being inclined downwardly relative to axial movement of said shaker rod in said one direction, and a follower member mounted on and extending radially outwardly from the opposite sides of said shaker rod, said follower member having portions which engage and ride along said cam surfaces and cause rotation of said shaker in one direction during axial movement of said shaker rod in one direction and cause rotation of said shaker rod in the opposite direction during axial movement of the shaker rod in the opposite direction.

* * * * *